United States Patent [19]
Pearson et al.

[11] Patent Number: 5,794,339
[45] Date of Patent: Aug. 18, 1998

[54] AUTOMATED ASSEMBLY OF TRANSMISSION COMPONENTS

[75] Inventors: Thomas E. Pearson, Grosse Ile; Thomas James, Rochester Hills, both of Mich.

[73] Assignee: Ford Global Technologies, Inc., Dearborn, Mich.

[21] Appl. No.: 363,852

[22] Filed: Dec. 27, 1994

[51] Int. Cl.$^6$ ..................................................... B23P 15/00
[52] U.S. Cl. .................... 29/889.5; 29/407.09; 29/407.1; 29/464; 29/714
[58] Field of Search ............................ 29/407.09, 407.1, 29/434, 714, 464, 889.5; 901/40, 45, 46, 9

[56] References Cited

U.S. PATENT DOCUMENTS

| | | |
|---|---|---|
| 4,145,802 | 3/1979 | d'Auria . |
| 4,502,279 | 3/1985 | Fuehrer . |
| 4,538,333 | 9/1985 | Cettl . |
| 4,594,762 | 6/1986 | Och . |
| 4,640,294 | 2/1987 | Ordo . |
| 4,843,708 | 7/1989 | Yokoi et al. . |
| 4,887,344 | 12/1989 | Kurihara et al. . |

FOREIGN PATENT DOCUMENTS

| | | |
|---|---|---|
| 1437003 | 5/1976 | United Kingdom . |

OTHER PUBLICATIONS

"Adaptive Robotic End–Effector Handles Challenging Applications", *Robotics World*, Summer 1993.

*Primary Examiner*—Larry I. Schwartz
*Assistant Examiner*—Marc W. Butler
*Attorney, Agent, or Firm*—Donald A. Wilkinson

[57] ABSTRACT

A method to automatically align the internal splines (20) of a torque converter (16) to mating external splines (18) of a transmission subassembly (14) during the assembly of the torque converter (16) to the transmission subassembly (14). The apparatus includes a robotic end effector assembly (26) coupled to an arm (22) of a robot (24). The end effector assembly (26) includes a compliance mechanism (51) and a distance sensor (48) that provide for compliance to allow the splines to align and detect if the splines are not properly mating. The end effector assembly (26) also includes an oscillator assembly (69) that is activated to cause non-aligned splines to become aligned during the automated assembly process.

2 Claims, 4 Drawing Sheets

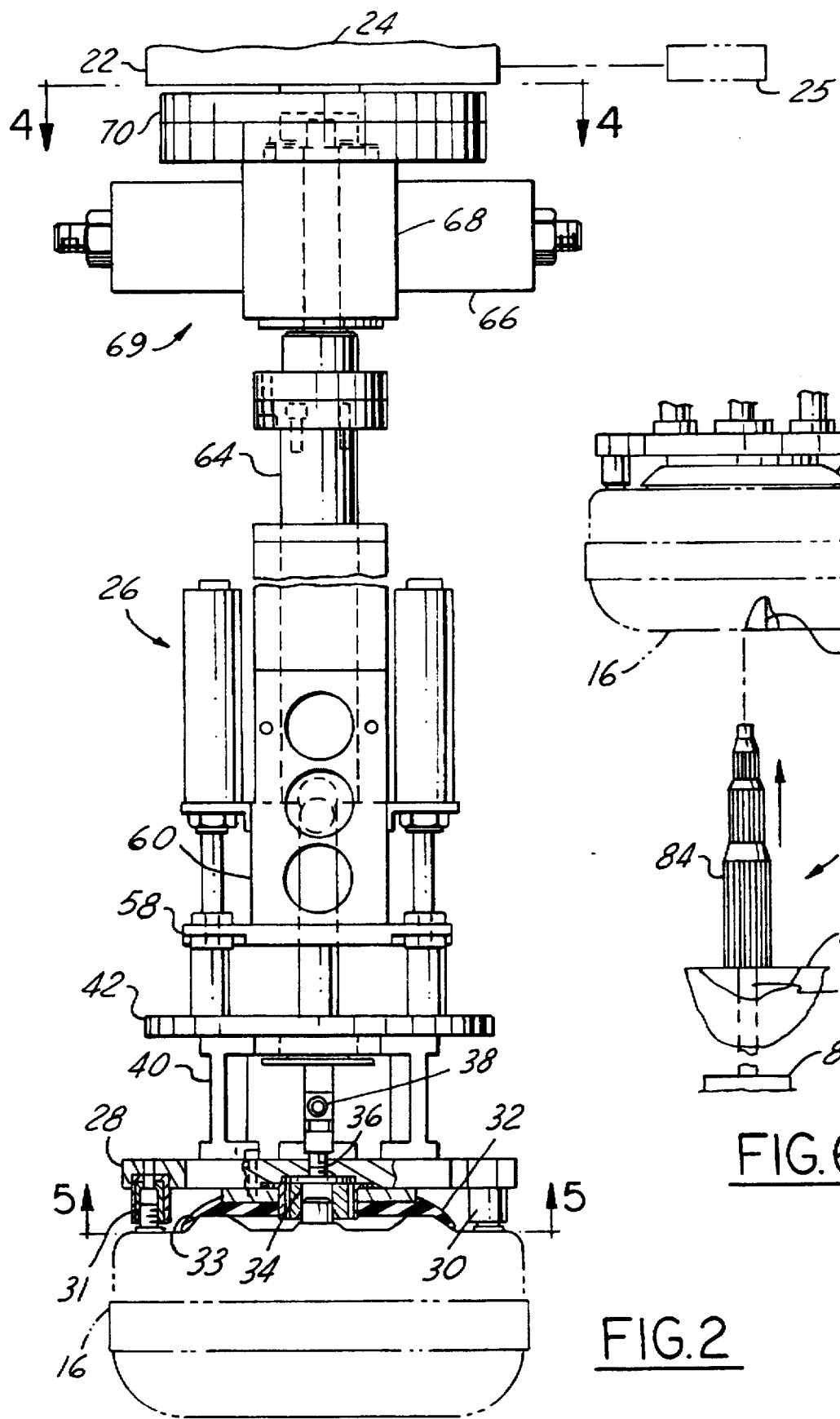
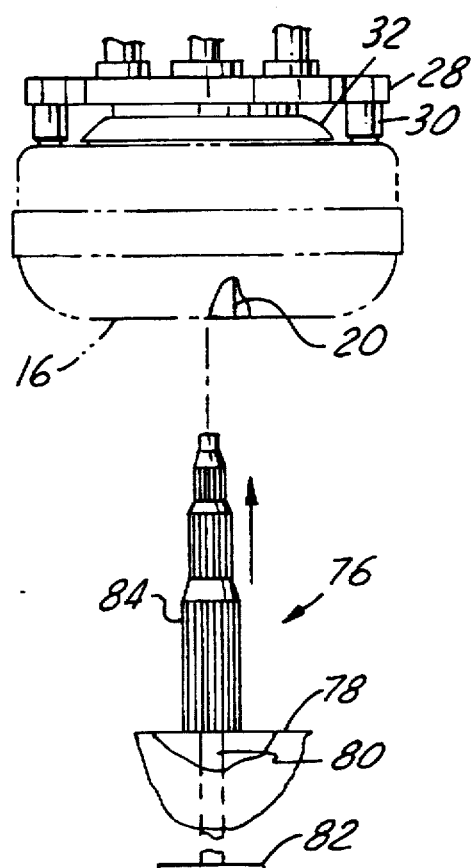
FIG. 6
FIG. 2

AUTOMATED ASSEMBLY OF TRANSMISSION COMPONENTS

FIELD OF THE INVENTION

The present invention relates to the automated assembly of components, having multiple mating splines, in vehicle transmissions, and more particularly to the assembly of a torque converter to a transmission subassembly. This application is related to co-pending patent application title, AUTOMATED ASSEMBLY OF TORQUE CONVERTERS TO TRANSMISSIONS, file herewith.

BACKGROUND OF THE INVENTION

During the assembly of an automatic transmission, a torque converter assembly is assembled to a transmission subassembly. In order to accomplish this assembly process, the internal splines of the torque converter must be aligned with the external splines of the transmission subassembly as the two are brought together. Currently, this process is generally done by hand. A person picks up a torque converter from a bin, carries it over to a transmission, lowers it down with the torque converter generally centered about the transmission splines, and then manipulates it until all of the splines align and the torque converter drops into place. This is a time consuming and thus expensive process, which allows for damage to components if dropped rather than set into place during assembly.

Consequently, there is a desire to mechanically pick, place and align splines of a torque converter assembly while assembling it to a transmission subassembly. However, due to the fact that several splines must all be aligned properly during assembly, with some of the splines able to freely rotate, spline alignment has proven difficult to automate.

One attempted solution to automatically assemble these components is to first pre-align all of the splines, both complete axial and rotational alignment, and then hold the alignments in place during assembly. This is very time consuming, and it is difficult to maintain the alignment. Furthermore, it requires a more expensive torque converter design due to a pinned stator support assembly and mounting bolts/pin relationship to the splines. Therefore, it is desirable to avoid this total pre-alignment type of process.

In order to avoid having to totally pre-align all of the splines, another attempted solution provides an automated system with processing capabilities that allow for the detection of non-engagement or engagement of splines during spline alignment assembly by using force feedback sensing technology. However, the technology required for force feedback end effectors on robots is very expensive to incorporate into a system and is also slow, due to the significant sensor and computer capabilities required; thereby rendering it impractical.

There is a need, then, for an automated assembly system that will minimize the cost and complexity of the assembly system while still allowing for a short cycle time when assembling the torque converter assembly to the transmission subassembly.

SUMMARY OF THE INVENTION

In its embodiments, the present invention contemplates a robot end effector assembly adapted to mount to an arm of a robot for the assembly of a torque converter having an internal set of splines onto a vehicle transmission subassembly having an external set of mating splines during automated assembly of the torque converter to the vehicle transmission. The end effector assembly includes lift means for securing the torque converter to and aligning it with the remainder of the end effector assembly, and a connector plate for securing the end effector to the robot arm. An upper support shaft is affixed to the connector plate, and a lower support shaft is coupled to the upper support shaft. The end effector assembly has oscillator means for inducing back-and-forth rotational movement of the lower member relative to the robot arm, and compliance means for coupling the lift means to the lower support shaft such that limited relative movement of the lift means relative to the lower support shaft can occur. A distance sensing means is included for monitoring relative vertical position between the lift means and the lower support shaft.

The invention further contemplates an automated method of aligning splines of a torque converter with splines of a vehicle automatic transmission subassembly while assembling the torque converter to the transmission subassembly using an end effector assembly connected to an arm of a robot. The method comprises the steps of: engaging the torque converter with the end effector assembly; positioning the torque converter over the transmission subassembly with the splines of the torque converter substantially centered over the splines of the transmission subassembly; providing a compliance mechanism in the end effector assembly such that a limited amount of relative movement can occur between the robot arm and the torque converter; providing sensing means coupled to the compliance mechanism such that the sensing means detects relative vertical position between the robot arm and torque converter; providing an oscillator assembly in the end effector assembly such that the torque converter can be turned back-and-forth relative to the robot arm; lowering the torque converter down onto the transmission subassembly until the sensing means detects a vertical change in relative position between the robot arm and torque converter; activating the oscillator, if the robot arm has not dropped a predetermined distance associated with full seating of the torque converter on the transmission subassembly; detecting a vertical change in relative position between the robot arm and the torque converter; repeating the lowering step until the robot arm has dropped the predetermined distance associated with a full seating of the torque converter; and deactivating the oscillator.

Accordingly, an object of the present invention is to provide a system for automated assembly of a torque converter assembly to a transmission assembly using position feedback from the end effector and a compliant joint on the end effector to allow for alignment of multiple splines during the assembly process, with a short cycle time.

It is an advantage of the present invention that the end effector allows for automatic assembly of a complex spline system, by providing an inexpensive compliant mechanism with a position feedback sensor and oscillation mechanism to provide for alignment of multiple splines during the assembly process.

BRIEF DESCRIPTION OF THE DRAWINGS

FIG. 2 is a side view, in partial section, of an end effector supporting a torque converter;

FIG. 6 is a side view of a concentric alignment tool assembly;

DETAILED DESCRIPTION OF THE PREFERRED EMBODIMENTS

Figure 1:
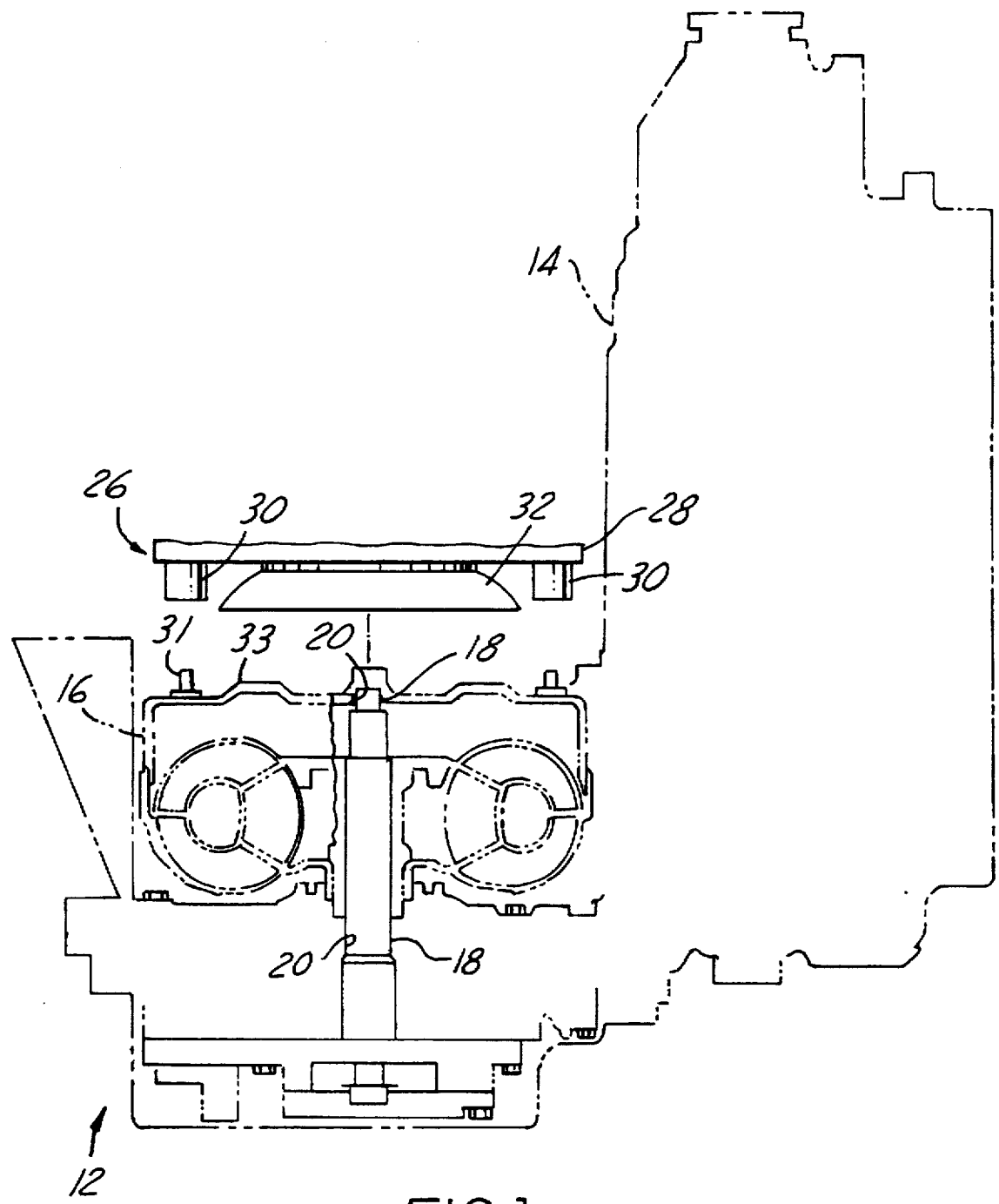
FIG. 1 is a side view, in partial section, of a typical automatic transmission showing a portion of the robot end effector after releasing a torque converter in the installed position.
Figure 4:
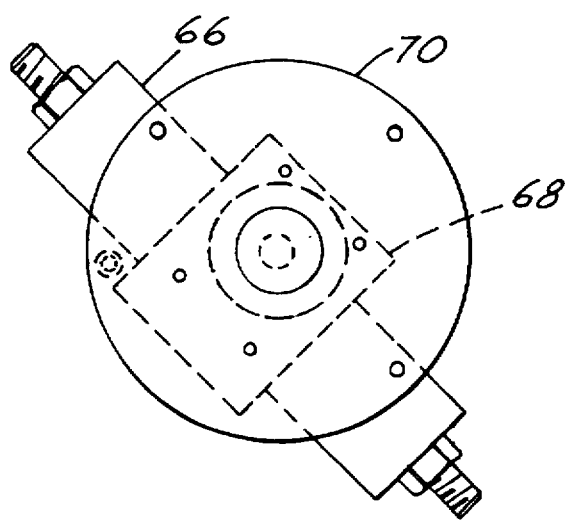
FIG. 4 is a view taken along line 4—4 in FIG. 2.
Figure 5:
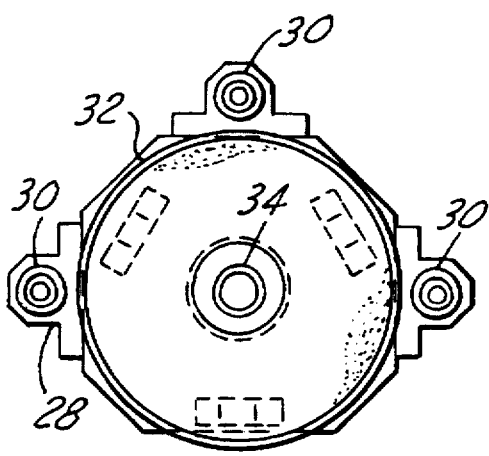
FIG. 5 is a view taken along line 5—5 in FIG. 2.
Figure 3:
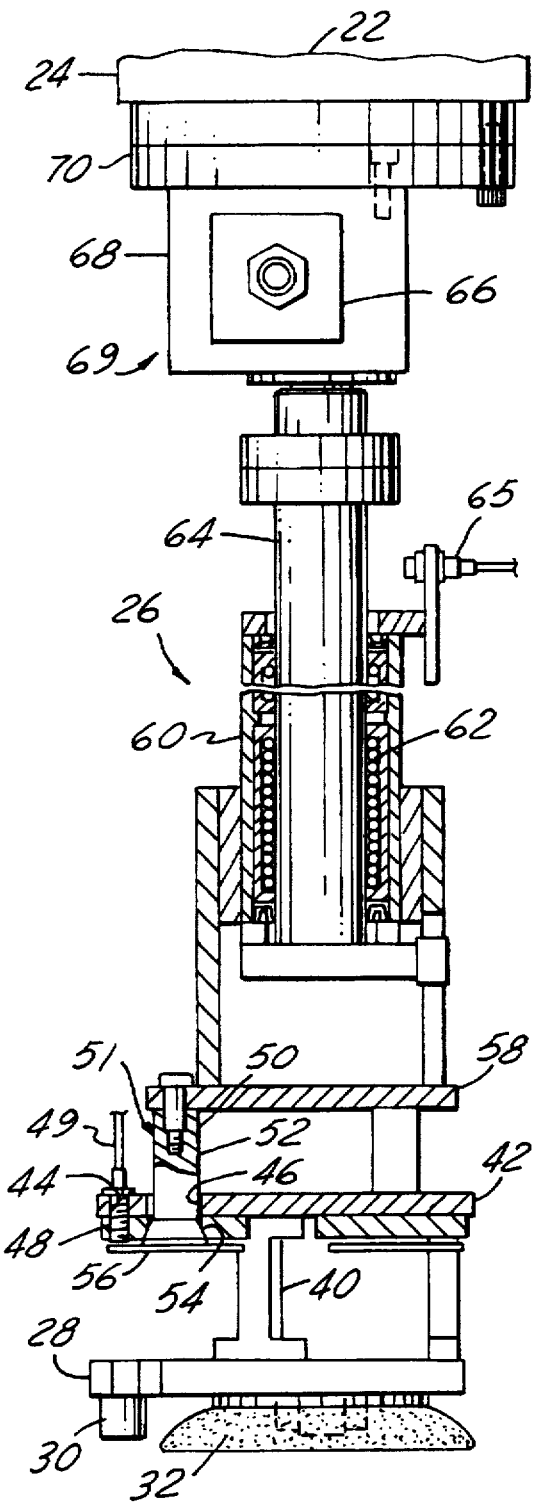
FIG. 3 is a side view, rotated 90 degrees, of the end effector of FIG. 2.

During assembly of an automatic transmission 12, a transmission subassembly 14 must be assembled to a torque converter 16. As torque converter 16 is assembled to transmission subassembly 14, three concentric external splines 18 on transmission subassembly 14 must slide into three mating internal splines 20 in torque converter 16. Most of the splines 18 and 20 are free to independently rotate, which makes aligning and maintaining alignment of the splines during assembly difficult. Thus, automated assembly using conventional robots is generally difficult and expensive. The following apparatus and method allow for alignment and mating of splines 18 and 20 during assembly of torque converter 16 to transmission subassembly 14.

An arm 22 of a conventional robot 24 is connected to an end effector assembly 26. Robot 24 is connected to a conventional electronic controller 25, shown schematically in FIG. 2. End effector assembly 26 includes a lower plate 28. Three stud cups 30 are connected about the perimeter of lower plate 28 and surround a rubber vacuum cup 32, also attached to lower plate 28. Stud cups 30 are sized and spaced to just slip over three of the four studs 31 protruding from torque converter 16, and vacuum cup 32 is sized to mate with a circular protrusion 33 on torque converter 16. A central vacuum hole 34 connects to a hollow tube 36 protruding through lower plate 28, which, in turn, connects to a connector 38 for a conventional vacuum line leading to a conventional vacuum mechanism, not shown.

Support members 40 are mounted between and affix lower plate 28 to an intermediate plate 42. Intermediate plate 42 includes a sensor bore 44 and an alignment bore 46. A position (distance) sensor 48 is mounted in and protrudes through sensor bore 44. Sensor wire 49 electrically connects sensor 48 to robot electronic controller 25.

A cylindrical portion 50 of a conical alignment member 52 telescopically fits within alignment bore 46 and has a diameter less than that of alignment bore 46. Conical alignment member 52 also includes a conical portion 54 affixed to cylindrical portion 50. The diameter of conical portion 54 where it meets cylindrical portion 50 has about the same diameter as cylindrical portion 50, and the widest diameter of conical portion 54 has a larger diameter than the diameter of the alignment bore 46. Conical portion 54 provides a self-centering aspect to this arrangement since alignment bore 46, when it comes to rest on conical portion 54, will inherently center itself about the cone shape, allowing for precision in knowing the relative position between the two while still allowing for axial compliance between the two when needed. This forms a compliance feature 51. Affixed to conical portion 54 is a sensor plate 56 that extends out from conical portion 54 past the end of and spaced from sensor 48.

Cylindrical portion 50 of conical alignment member 52 is affixed to a second intermediate plate 58. Intermediate plate 58 is, in turn, connected to a lower support shaft 60, that is coupled, through ball bearing assemblies 62, to an upper support shaft 64. Ball bearing assemblies 62 allow upper support shaft 64 to move vertically relative to lower support shaft 60 but do not allow the two to rotate relative to one another. The upper support shaft 64 extends up to a rack-and-pinion oscillator 66. Rack-and-pinion oscillator 66 includes a motor 68, that is electrically connected to the robot controller. This forms an oscillator assembly 69. A robot connector plate 70 is affixed to rack-and-pinion oscillator 66 and, in turn, is mounted to robot arm 22.

An energy stop break-away sensor 65 is fixed relative to lower support shaft 60 and electrically connected to the robot controller. If, during the assembly procedure, lower support shaft 60 moves upward relative to upper support shaft 64 more than a predetermined distance, then sensor 65 signals controller 25 to cease robot operation, and a manual intervention is likely to be needed.

In addition to end effector assembly 26, an additional alignment tool assembly 76 may also be employed, as shown in FIG. 6. Alignment tool assembly 76 includes a base 78 and a push-rod 80 telescopically protruding through a bore in base 78. Connected to one end of push-rod 80 is a movement mechanism 82, and connected to the other end of push-rod 80 is an alignment tool 84. Alignment tool 84 includes three portions of varying diameter that match a corresponding diameter and spacing of internal splines 20 in torque converter 16.

The method of assembling torque converter 16 to transmission subassembly 14 will now be described. Controller 25 causes robot 24 to move end effector assembly 26 over to the next torque converter 16 to be assembled and lines up stud cups 30 over three of the four studs 31. This will assure that vacuum cup 32 is properly aligned over circular protrusion 33. End effector assembly 26 is lowered onto torque converter 16 and the conventional vacuum mechanism is activated so that vacuum cup 32 secures itself to torque converter 16. Maintaining the vacuum pressure, robot 24 lifts torque converter 16 and moves it over to the vicinity of transmission subassembly 14, generally centered above external splines 18. At this point, intermediate plate 42, which is affixed to vacuum cup 32 through support members 40 and lower plate 28, is supported by conical portion 54 of conical alignment member 52 via its alignment bore 46, the edges of which rest on conical portion 54. This will allow for an overall flexible connection between robot arm 22 and vacuum cup 32.

Robot 24 then lowers end effector assembly 26 and, consequently, torque converter 16 downward toward external splines 18. Distance sensor 48 senses the distance from its tip to sensor plate 56. As long as the distance between the tip and sensor plate 56 remains less than a certain predetermined distance, robot 24 will continue to lower torque converter 16. If, by chance, all three external splines 18 were perfectly aligned with their corresponding internal splines 20, then robot 24 will continue lowering torque converter 16 until it is completely seated in transmission subassembly 14.

At this point, torque converter 16 will cease to move downward with end effector assembly 26. This, in turn, will cause intermediate plate 42 to lift upward relative to conical alignment member 52, which is affixed to second intermediate plate 58 that is still lowering along with the upper portion of end effector assembly 26. The gap between the tip of distance sensor 48 and sensor plate 56 will increase. When the gap reaches a predetermined size, sensor 48 will signal to robot controller 25 to cease lowering end effector assembly 26. Controller 25 at this point will determine how far the end of robot arm 22 connected to end effector 26 has moved downward. If it has moved more than a predetermined distance, torque converter 16 will be considered properly seated.

At this point, it is desirable, although not required, to have a second conventional type of robot, or a fixture mounted spring clamp device, not shown, engage the fourth stud 31 of torque converter 16 to assure that torque converter 16 stays put while securing it to transmission subassembly 14. Robot 24 then releases the vacuum suction in vacuum cup 32 and lifts end effector assembly 26 upward, off of torque converter 16.

On the other hand, if end effector assembly 26 is generally aligned over external splines 20, and if the topmost external spline 18 is not aligned with the first internal spline 20, as robot 24 lowers end effector assembly 26, these two splines will contact one another. This will prevent torque converter 16 from continuing to lower as the upper portion of end effector assembly 26 continues to be lowered. The gap between the tip of distance sensor 48 and sensor plate 56 will increase until it reaches a predetermined distance. At this point, sensor 48 will send a signal to controller 25 to stop robot 24 from lowering end effector 26. Controller will also determined the distance that robot arm 22 has lowered. If it is less than a predetermined distance, controller 25 will assume that torque converter 16 is not fully seated. This position type of feedback, then, is used to determine if the corresponding splines have been aligned.

Compliance feature 51, in effect, decouples the rigid robot 24 from the rigid transmission splines and avoids robotic faults through drive overloads. Without this cushion feature, robot 24 could fault, bringing the assembly process to a halt, and forcing manual intervention.

Controller 25 now activates oscillator motor 68. Little computing power is needed for this function. Oscillator motor 68 will cause the rack to move back-and-forth rapidly, which in turn, causes the pinion, which is coupled to upper support shaft 64, to rotate back and forth, which consequently, causes torque converter 16 to rotate back and forth. Stud cups 30 provide lateral support, allowing for the back-and-forth twisting to take place without imparting too much twisting force on vacuum cup 32. The rotation back and forth allows the upper external spline 18 to slip rotationally relative to the lower internal spline 20. As an optional additional orientation step, as oscillator motor 68 operates, robot 24 provides additional motion via orientation changes that tilt end effector assembly 26 out of its straight vertical orientation.

Further, since alignment bore 46 has a larger diameter than cylindrical portion 50 of conical alignment member 52, a small amount of axial slip of the upper external spline 18 relative to the lower internal spline 20 can occur. This continues until the two splines become aligned. When they do become aligned, torque converter 16 is free to drop down, mating the two splines. As torque converter 16 drops, the gap between the tip of distance sensor 48 and sensor plate 56 decreases. Sensor 48, in effect, detects alignment of the current splines. This signals controller 25 that the first set of splines are aligned.

The process now shifts downward to align subsequent splines. Again controller 25 causes robot 24 to begin moving downward until the gap becomes larger than the predetermined distance, and then stops robot 24 from moving downward. The controller again determines if torque converter 16 is fully seated by determining if the distance that robot arm 22 has moved downward is greater than a predetermined distance. If it is, then torque converter 16 is considered seated and the process continues as in the first instance when all of the splines were aligned. If not, then oscillator motor 68 continues to drive the back-and-forth motion until the next set of splines are aligned as described for the first set.

This continues for the subsequent set of mating splines, until controller 25 determines that torque converter 16 is fully seated in transmission subassembly 14, meaning that all splines have been aligned. The process now continues as described above for a fully seated torque converter 16. In this way, the process and equipment automatically places and aligns each individual spline during transmission component assembly.

Alignment tool assembly 76 can also be used to pre-align internal splines 20 in torque converter 16 concentrically before assembling to transmission subassembly 14. This desire for concentricity in alignment is due to the fact that splines in torque converter 16 can move relative to one another in a planar manner. In this case, before alignment of torque converter 16 over external splines 18, robot 24 aligns internal splines 20 of torque converter 16 over alignment tool assembly 76. Movement mechanism 82 lifts alignment tool 84 up into internal splines 20 and lowers back down. In this way, concentric alignment can be achieved. However, the trade-off is the slightly increased cycle time for this extra step in the assembly process, although this is still less time consuming than complete concentric and rotational alignment and maintenance of both the internal and external splines before automated assembly. In order to further reduce cycle time, this alignment step can also be done while torque converter 16 is on a conventional conveyer, not shown, prior to being picked-up by end effector 26.

Figure 8:
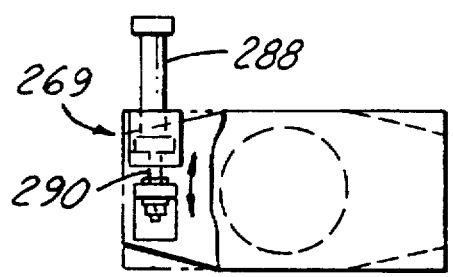
FIG. 8 is a view taken along line 8—8 in FIG. 7.
Figure 9:
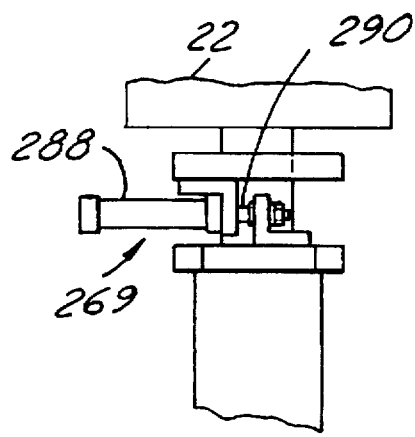
FIG. 9 is a view taken along line 9—9 in FIG. 7.
Figure 7:
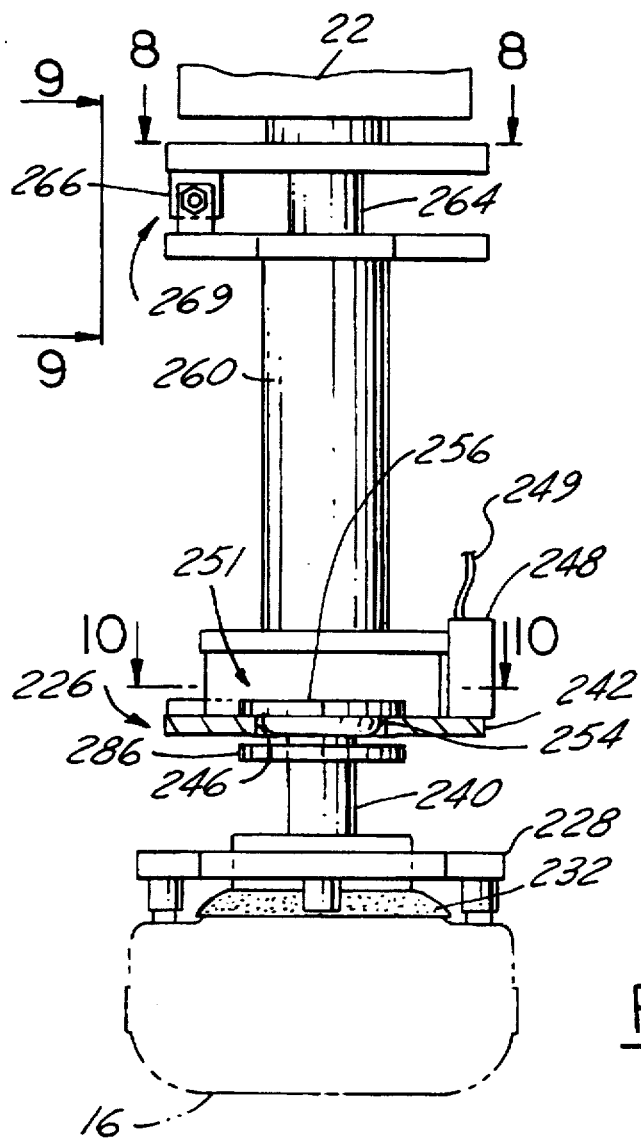
FIG. 7 is a side view, in partial section, of an alternate embodiment of an end effector.
Figure 10:
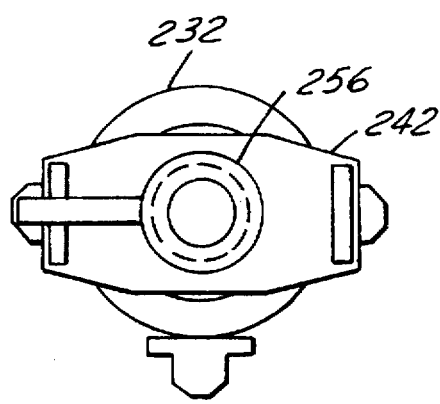
FIG. 10 is a section cut taken along line 10—10 in FIG. 7.

A second embodiment of the present invention is shown in FIGS. 7–10. This embodiment performs the same function as the first. The main differences are in the compliance feature and the oscillator assembly. For purposes of this description, elements in the second embodiment that have counterpart elements in the first embodiment have been identified by similar reference numerals, although in a 200 series.

The conical compliance feature 51 of the first embodiment is replaced with a ball-and-socket compliance feature 251. Lower plate 228 again connects to vacuum cup 232, and is also connected to a support shaft 240. Support shaft 240 protrudes through an alignment bore 246 in intermediate plate 242 and is mounted to a ball 254 at its end. Ball 254 has substantially the same diameter as alignment bore 246, so alignment bore 246 acts as the socket for ball 254.

Support shaft 240 also includes a stop member 286, having a greater diameter than alignment bore 246, affixed below intermediate plate 242. A sensor plate 256, having a greater diameter than alignment bore 246, is affixed to ball 254 above intermediate plate 242. A position (distance) sensor 248 is mounted to intermediate plate 242 and detects the distance between intermediate plate 242 and sensor plate 256. It is electrically connected to the robot controller, not shown.

Ball-and-socket compliance feature 251 provides the compliance and sensing capabilities similar to conical compliance feature 51 of the first embodiment. When torque converter 16 is lifted by end effector assembly 226, sensor plate 256 will rest on intermediate plate 242 and distance sensor 248 will detect no gap between them. If, while robot 24 is lowering torque converter 16 onto transmission subassembly 14, any of the external splines 18 do not mate with their respective internal splines 20, sensor plate 256 will rise relative to intermediate plate 242 and sensor 248 will detect a gap between them. If the gap becomes larger than a predetermined amount, then a signal is sent to the robot controller and robot 24 ceases the downward movement of end effector assembly 226.

A further change from the first embodiment is the oscillator assembly 269. The rack-and-pinion 66 of the oscillator assembly 69 in the first embodiment is replaced with a piston oscillator 266 off-set from the centerline of the upper and lower support shafts. It is electrically connected to the robot controller. Piston oscillator 266 includes a housing 288, connected to upper support member 264 and a conventional pneumatic source, and a piston 290, telescopically received in housing 288 at one end and affixed to lower support member 260 at its other end.

Piston oscillator assembly 269 provides oscillation functions similar to oscillator assembly 69 of the first embodiment. If sensor 248 detects a gap between sensor plate 256 and intermediate plate 242 and the distance that robot arm 22 has dropped is below the amount necessary for the controller to assume that torque converter 16 is fully seated, then oscillator assembly 269 is activated. The conventional pneumatic source repeatedly increases and decreases the pressure in housing 288, causing piston 290 to push out and pull back repeatedly. Lower support member 260 will, thus, twist back-and-forth, allowing for the slippage of the splines needed for alignment with one another. Once the set of splines becomes aligned, torque converter 16, along with compliance feature 251, will drop and distance sensor 248 will signal the controller, which will cease operation of oscillator assembly 269 and begin lowering end effector assembly 226 again. This will be repeated until torque converter 16 is fully seated as in the first embodiment.

While certain embodiments of the present invention have been described in detail, those familiar with the art to which this invention relates will recognize various alternative designs and embodiments for practicing the invention as defined by the following claims.

We claim:

1. An automated method of aligning splines of a torque converter with splines of a vehicle automatic transmission subassembly while assembling the torque converter to the transmission subassembly using an end effector assembly connected to an arm of a robot, the method comprising the steps of:

positioning the transmission subassembly with the splines extending upwards in a substantially vertical direction;

engaging the torque converter with the end effector assembly;

positioning the torque converter over the transmission subassembly with the splines of the torque converter substantially centered over the splines of the transmission subassembly;

providing a compliance mechanism in the end effector assembly such that a limited amount of relative movement can occur between the robot arm and the torque converter;

providing sensing means coupled to the compliance mechanism such that the sensing means detects relative vertical position between the robot arm and torque converter;

providing an oscillator assembly in the end effector assembly such that the torque converter can be turned back-and-forth relative to the robot arm;

lowering the torque converter down onto the transmission subassembly until the sensing means detects a vertical change in relative position between the robot arm and torque converter;

activating the oscillator if the robot arm has not dropped a predetermined distance associated with full seating of the torque converter on the transmission subassembly;

detecting a vertical change in relative position between the robot arm and the torque converter;

repeating the lowering step until the robot arm has dropped the predetermined distance indicating a full seating of the torque converter; and deactivating the oscillator.

2. A method according to claim 1 further including the steps of:

providing a pre-alignment tool assembly having alignment tools with diameters and length generally matching that of the torque converter splines; and inserting the pre-alignment tool assembly into and removing it from the torque converter splines, whereby the torque converter splines will be generally radially aligned with the transmission subassembly splines, prior to performing the lowering the torque converter step.

* * * * *